United States Patent [19]

Lockard et al.

[11] Patent Number: 4,989,890

[45] **Date of Patent: * Feb. 5, 1991**

[54] LENGTH AND WIDTH ADJUSTABLE WHEELCHAIR

[75] Inventors: Walter G. Lockard, Elyria; Herbert J. Hoekstra, Ridgeville; Allen J. Boris; Douglas M. Nickles, both of Elyria, all of Ohio

[73] Assignee: Invacare Corporation, Elyria, Ohio

[ * ] Notice: The portion of the term of this patent subsequent to Mar. 21, 2006 has been disclaimed.

[21] Appl. No.: 284,233

[22] Filed: Dec. 14, 1988

Related U.S. Application Data

[63] Continuation of Ser. No. 927,802, Nov. 5, 1986, Pat. No. 4,813,693, which is a continuation-in-part of Ser. No. 931,501, Sep. 30, 1986, Pat. No. 4,840,390.

[51] Int. Cl.[5] .......................... B62M 1/14; B62B 11/00

[52] U.S. Cl. .......................................... 280/42; 280/650; 280/250.1; 280/304.1; 297/DIG. 4

[58] Field of Search ............... 180/907; 280/42, 250.1, 280/304.1, 650, 655, 657, 47.371, 638, 639, 647; 297/DIG. 4, 416, 429, 431

[56] References Cited

U.S. PATENT DOCUMENTS

| | | | |
|---|---|---|---|
| 2,592,449 | 4/1952 | Miller | 297/DIG. 4 X |
| 2,669,289 | 2/1954 | Usher et al. | 280/42 X |
| 2,798,565 | 7/1957 | Rosenthal et al. | 180/907 X |
| 3,064,744 | 11/1962 | Jennings | 180/907 X |
| 3,807,520 | 4/1974 | Chisholm | 180/907 X |
| 3,901,527 | 8/1975 | Danziger et al. | 280/250.1 |
| 3,912,032 | 10/1975 | Benz et al. | 280/250.1 X |
| 3,917,312 | 11/1975 | Rodaway | 280/250.1 |
| 3,937,490 | 2/1976 | Nasr | 280/250.1 |
| 3,945,449 | 3/1976 | Ostrow | 180/907 X |
| 4,165,127 | 8/1979 | Vago | 297/345 X |
| 4,264,085 | 4/1981 | Volin | 280/304.1 X |
| 4,326,732 | 4/1982 | Gall | 280/250.1 X |
| 4,358,125 | 11/1982 | Charles | 280/250.1 |
| 4,405,142 | 9/1983 | Whetstine | 280/250.1 X |
| 4,500,102 | 2/1985 | Haury et al. | 280/250.1 |
| 4,555,121 | 11/1985 | Lockard et al. | 280/250.1 X |
| 4,603,879 | 8/1986 | Morrissette | 280/655 X |
| 4,655,471 | 4/1987 | Peek | 280/250.1 |
| 4,773,494 | 9/1988 | Anderson | 180/907 X |
| 4,813,693 | 3/1989 | Lockard et al. | 280/42 |
| 4,840,390 | 6/1989 | Lockard et al. | 280/42 X |

FOREIGN PATENT DOCUMENTS

| | | | |
|---|---|---|---|
| 802663 | 12/1968 | Canada | 297/DIG. 4 |
| 2141980 | 1/1985 | United Kingdom | 280/304.1 |

OTHER PUBLICATIONS

"Enduro by Wheel Ring—The Totally Expandable and Adjustable Child's Chair"—advertising brochure by Wheel Ring, Inc., 175 Pine St., Manchester, CT 06040.

(List continued on next page.)

*Primary Examiner*—Charles A. Marmor

*Assistant Examiner*—Brian L. Johnson

*Attorney, Agent, or Firm*—Fay, Sharpe, Beall, Fagan, Minnich & McKee

[57] ABSTRACT

Wheelchair side frames (A) include forward and rearward side frame portions (10, 12) which are telescopically interconnected such that the length of the side frames is selectively adjustable. A cross brace folding assembly (B) interconnects the side frames and selectively moves the side frames between folded and open configurations. The cross brace mechanism includes a pair of cross brace members (30, 32) which are pivotally interconnected (34) and which are each adjustable in length to adjust the width of the wheelchair in the open configuration without adjusting the height of the seat (100). A pair of rear seat support members (114) are telescopically mounted on posts (112) of the rear frame and are interconnected with stand-off members (120) for supporting a seat back portion (110). The stand-off members hold the seat back away from the rear seat support members such that the clamps from orthopedic braces and appliances may be freely mounted therealong. A front foot rest assembly (D) includes a foot rest supporting member (174) which adjusts up/down, fore-/aft, and the degree of tilt. Front wheel mounting assemblies (E) are mounted to the side frame at a selectively adjustable angle.

13 Claims, 7 Drawing Sheets

OTHER PUBLICATIONS

"Children's Series" advertising brochure of Stainless Medical Products, Div. of S&D Medical Products, 9389 Dowdy Drive, San Diego, CA 92126.

"Ortho-Kinetics—Kids are OK"—advertising brochure of Ortho-Kinetics, Inc., W220 N507 Sprindale Road, Waukesha, WI 53187.

"TEC-Specialists in Home Health Care"—advertising brochure of Therapeutic Equipment Corp., 60 Page Road, Clifton, NJ 07012.

"QUADRA-Junior/Child's Models"—advertising brochure of Quadra Wheelchairs, Inc., 31115 Via Colinas, Westlake Village, CA 91362.

"Ultralight Premier-Children's & Junior Models"—advertising brochure of Everestt & Jennings, 3233 East Mission Oaks Blvd., Camarillo, CA.

"Kids Quickie 2"—advertising brochure of Motion Designs, Inc., 2842 Business Park, Fresno, CA 93727.

"Exceptional Children's Products"—advertising brochure of Invacare Corp., 899 Cleveland St., Elyria, OH 44036.

LENGTH AND WIDTH ADJUSTABLE WHEELCHAIR

This application is a continuation of U.S. patent application Ser. No. 927,802, filed Nov. 5, 1986, now U.S. Pat. No. 4,813,693, which is a continuation-in-part of U.S. patent application Ser. No. 913,501, filed Sept. 30, 1986, now U.S. Pat. No. 4,840,390.

BACKGROUND OF THE INVENTION

The present invention relates to the art of personal mobility vehicles, particularly vehicles for the physically impaired. Particular application is found in children's wheelchairs which grow and expand with the child. However, it is to be appreciated that the present invention may also be applicable to wheelchairs for adults and may be utilized to custom fit wheelchairs to adults, may enable the chair to be utilized by adults or children of different sizes, or may be applicable to other vehicles.

Heretofore, wheelchairs have been manufactured in various sizes to accommodate children as they grow. Manufacturing children's chairs in only fixed sizes would require frequent replacement of the entire chair and a large financial burden on parents. Accordingly, children's chairs have commonly been constructed to accommodate size alteration that they enable the child to use the chair over a wider range of physiological development. In one solution, the frame was constructed in modules. Various frame portions were replaced as the child grew to widen the chair, lengthen the seat, and increase the height of the back. However, replacement parts were relatively expensive, as compared to the same parts when purchased in a complete assembly. The removed modular parts tended to have even less market value than a used chair which has been outgrown. On occasion, models were discontinued during the several years a chair was in use and expansion modular parts became scarce or unavailable.

In another solution, seats of different sizes have been selectively mounted on a conventional, full size wheelchair frame. However, because the child's seat tended to be much shorter than a conventional frame, the frame extended forward significantly past the child's feet. This excessive forward extension created difficulty in maneuvering the chair and pulling up to tables and desks. Modular frame construction or add-on pieces were employed on some chairs to alter the length of the frame without affecting its structural strength.

Because the back of a small child's chair is relatively short, the push handles commonly extended well above the back to reach a convenient height for an adult to push the chair. However, the high push handles were considered offensive by many of the children. The presence of push handles, particularly highly visible push handles, tended to create an undesirable appearance of dependency.

Many children who have been confined to a wheelchair require orthopedic pads and braces, particularly for the upper body. Commonly, head pads, torso support pads, and other orthopedic pads and appliances were clamped to the seat back support tubes. In order to accommodate adjustment as the child grew and positioning the pads exactly as required by each child, great flexibility in potential mounting sites was required. Mounting screws and straps for the seat back tended to interfere with proper placement of the pads and appliances.

The present invention provides a new and improved adjustable child's wheelchair which overcomes the above referenced problems, yet expands easily to accommodate a child with growth.

SUMMARY OF THE INVENTION

In accordance with one aspect of the present invention, an adjustable wheelchair is provided which is adjustable in width while retaining a constant height. The wheelchair includes a pair of side frames on which a plurality of wheels are mounted. An adjustable folding mechanism foldably interconnects the side frames. The folding mechanism is selectively adjustable to adjust the distance between the side frames in an open or unfolded configuration.

In accordance with another aspect of the present invention, an adjustable wheelchair is provided that facilitates the attachment of orthopedic pads and appliances. A plurality of wheels are operatively connected with a pair of side frames. A pair of rear seat support members to which the orthopedic pads and appliances are adapted to be clamped extend upward from the side frames. A stand-off means is connected adjacent upper and lower ends of the rear seat support members and a seat back portion is mounted to the stand-off means. By mounting the seat back to the stand-off means rather than directly to the rear seat support members, the rear seat support tubes remain unencumbered to receive the orthopedic pads and appliances freely therealong.

In accordance with another aspect of the present invention, the side frames have a generally vertically disposed post mounted along an upper member thereof and disposed forward from the rear of the side frame. Each rear back support member is telescopically connected with one of the posts. The telescopic interengagement enables the back support members to be removed and replaced with members of different sizes to accommodate taller and shorter children.

In accordance with another aspect of the present invention, a wheelchair is provided in which a plurality of wheels are operatively connected with a pair of side frames. A foldable rear push handle assembly includes a lower mounting portion which is connected with one of the side frames and extends upward therefrom. A handle member is connected to the lower mounting portion by a locking hinge means which selectively locks the handle in either an upper, pushing position in which it is readily grasped by an attendant or folded downward.

In accordance with yet another aspect of the present invention, an adjustable wheelchair is provided in which a plurality of wheels are operatively connected with a pair of side frames. Each pair of front foot support assemblies are interconnected with one of the side frames. Each foot support assembly includes a foot supporting member having a generally horizontally disposed foot supporting surface. A foot rest support post is connected with the corresponding side frame. A bracket is selectively mounted with the foot rest support post such that it is connectable in a selectable height therealong. An adjustable mounting means mounts the foot support member to the bracket such that the foot support member is movable fore and aft relative to the bracket. In this manner, the foot supporting surface is movable both up/down, for dorsal and plantar flexion.

In accordance with yet another aspect of the present invention, a wheelchair is provided which includes a pair of side frames to which rear wheels and front wheel assemblies are mounted. Each front wheel assembly includes a mounting member or bracket which defines a pivot aperture and an elongated arcuate slot at a generally constant radius from the pivot aperture. A transverse passage is defined generally parallel to the arcuate slot. A first fastener extends through the pivot aperture and operatively connects the bracket with the side frames such that mounting bracket is pivotal around the first fastener. A second fastener extends through the arcuate slot and is operatively connected with the side frame. As the bracket is pivoted around the first fastener, the second fastener is moved along the arcuate slot. The second fastener has a threaded bore transversely therethrough disposed generally in alignment with the transverse passage. A threaded member extends along the transverse passage and through the second fastener threaded bore for selectively locking the position of the second fastener within the arcuate slot, hence, for selectively locking the position of the bracket around the first fastener. By selectively rotating the threaded member, the second fastener is cammed along the arcuate slot to fix the relative pivotal position of the bracket, hence the angle of the front wheel assembly relative to the wheelchair.

A primary advantage of the present invention is that the wheelchair grows and expands as the child grows.

Another advantage of the present invention is that it facilitates ease of size adjustment.

Yet another advantage of the present invention is that it improves wheelchair economy and life span.

Still further advantages will be apparent to those of ordinary skill in the art upon reading and understanding the following detailed description.

BRIEF DESCRIPTION OF THE DRAWINGS

The invention may take form in various parts and arrangements of parts. The drawings are only for purposes of illustrating a preferred embodiment and are not to be construed as limiting the invention.

DETAILED DESCRIPTION OF THE PREFERRED EMBODIMENT

Figure 1:
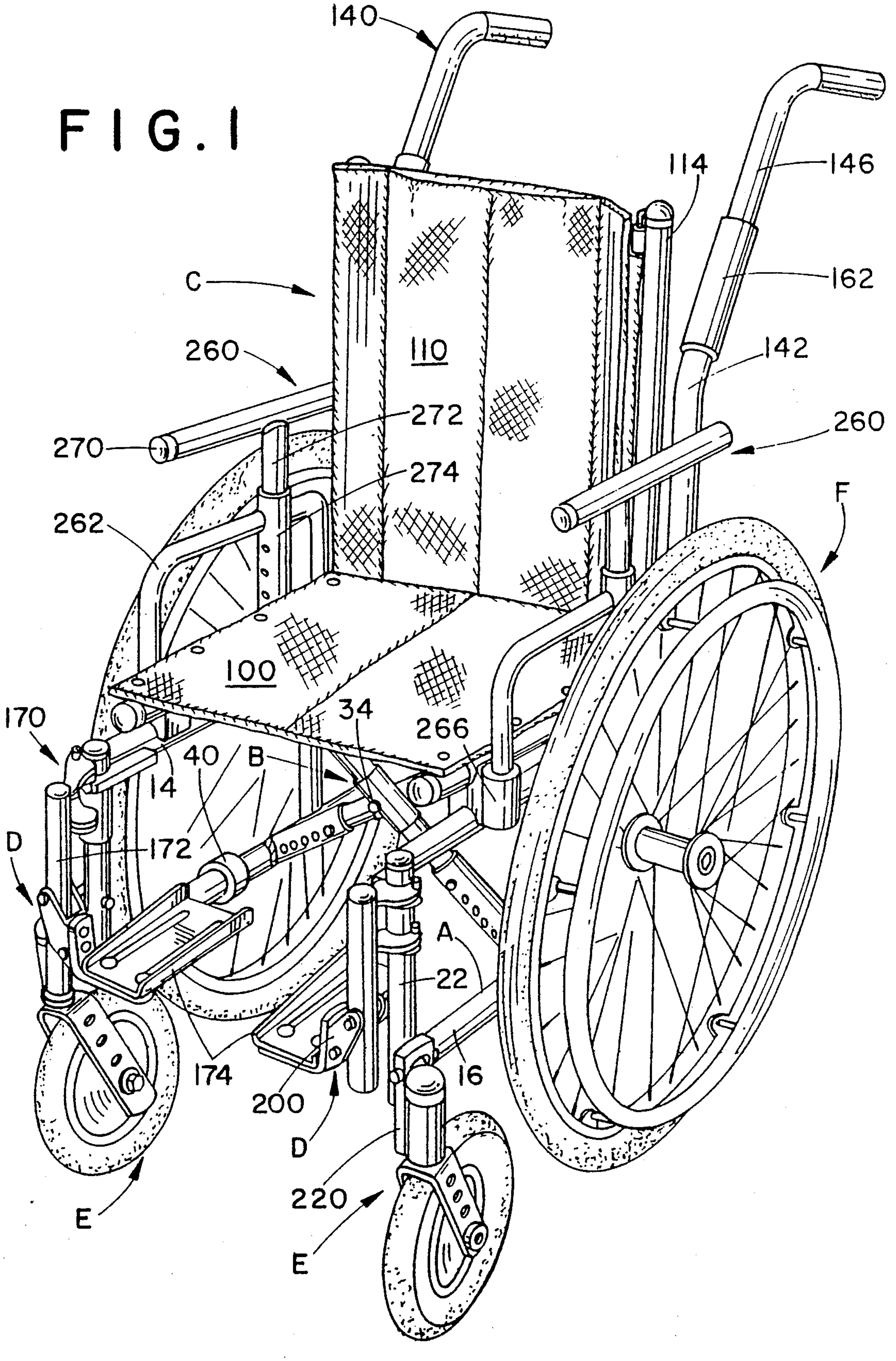
FIG. 1 is a perspective view of a wheelchair in accordance with the present invention.
Figure 2:
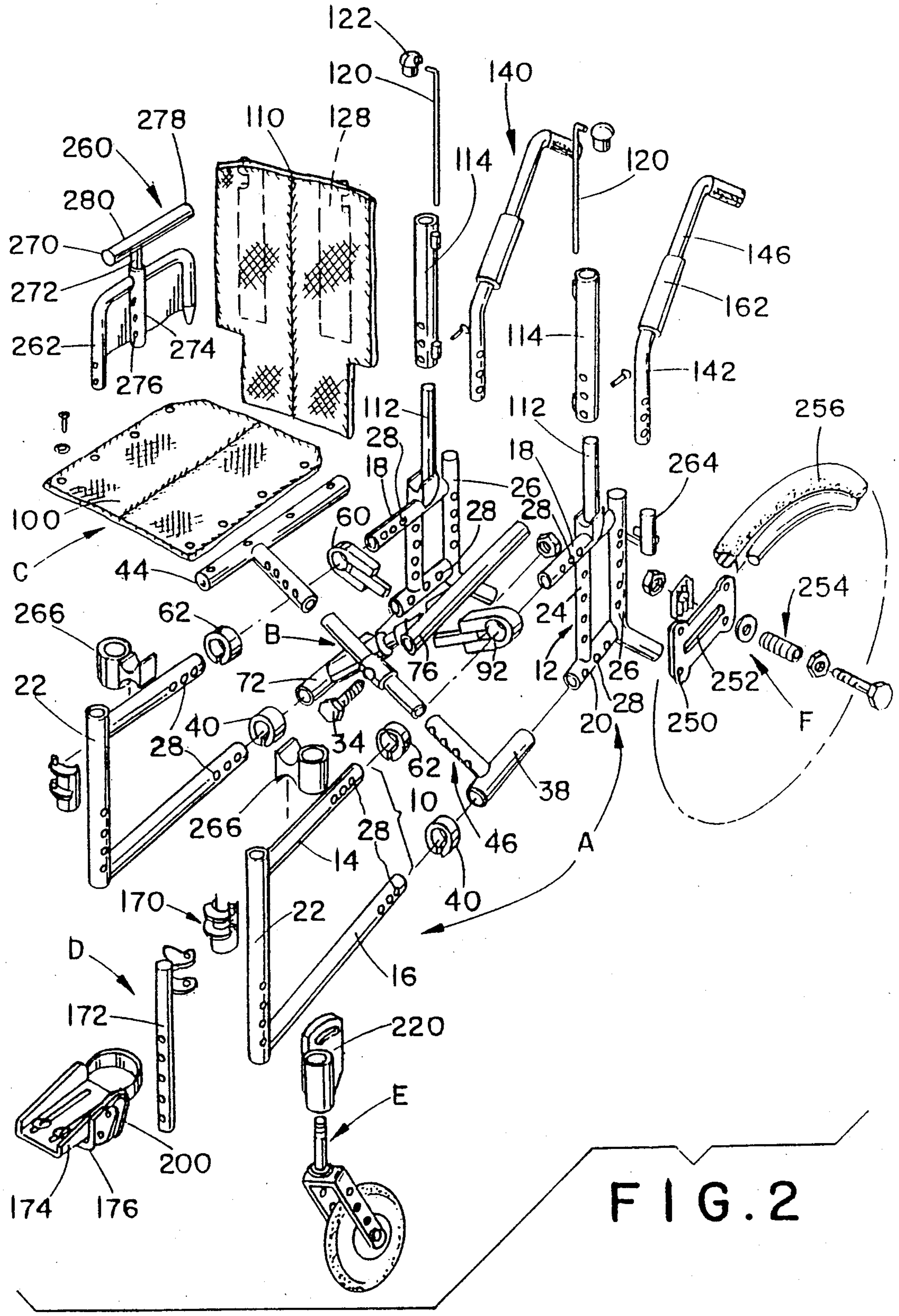
FIG. 2 is an exploded view of the wheelchair of FIG. 1 with some parts removed for simplicity of illustration.

With particular reference to FIGS. 1 and 2, the wheelchair includes a pair of length adjustable side frames A which are disposed longitudinally in a parallel relationship to each other. A width adjustable cross brace folding assembly B which interconnects the side frames. A length, width, and height adjustable seat assembly C is supported by the side frames and the folding assembly. Adjustable foot rest assemblies D are selectively mounted to the side frames to support a child's feet. The side frames are supported on the ground by adjustable front wheel assemblies E and adjustable rear wheel assemblies F.

With continuing reference to FIGS. 1 and 2, each side frame assembly includes a forward frame portion 10 which is telescopically received in a rearward frame portion 12 to define a length adjusting means. More specifically to the preferred embodiment, the forward frame portion includes upper and lower horizontally extending tubes 14, 16 which are telescopically received with rear side frame portions horizontally extending tubes 18, 20, respectively. The front frame portion horizontally extending tubes are interconnected by a generally vertical forward tube portion 22. The horizontally extending rear frame tubes are interconnected by a first generally vertically tube portion 24 and an aft generally vertical tube portion 26. The side frame length adjusting means in the preferred embodiment include apertures 28 in the forward and rearward side frame portions horizontally extending members through which a bolt or a sheet metal screw extend to fix the degree of telescopic receipt. In the preferred embodiment, the apparatures 28 are at one inch intervals to enable the side frames to be extended at increments of one inch. Other extension increments may, of course, be selected.

Figure 3:
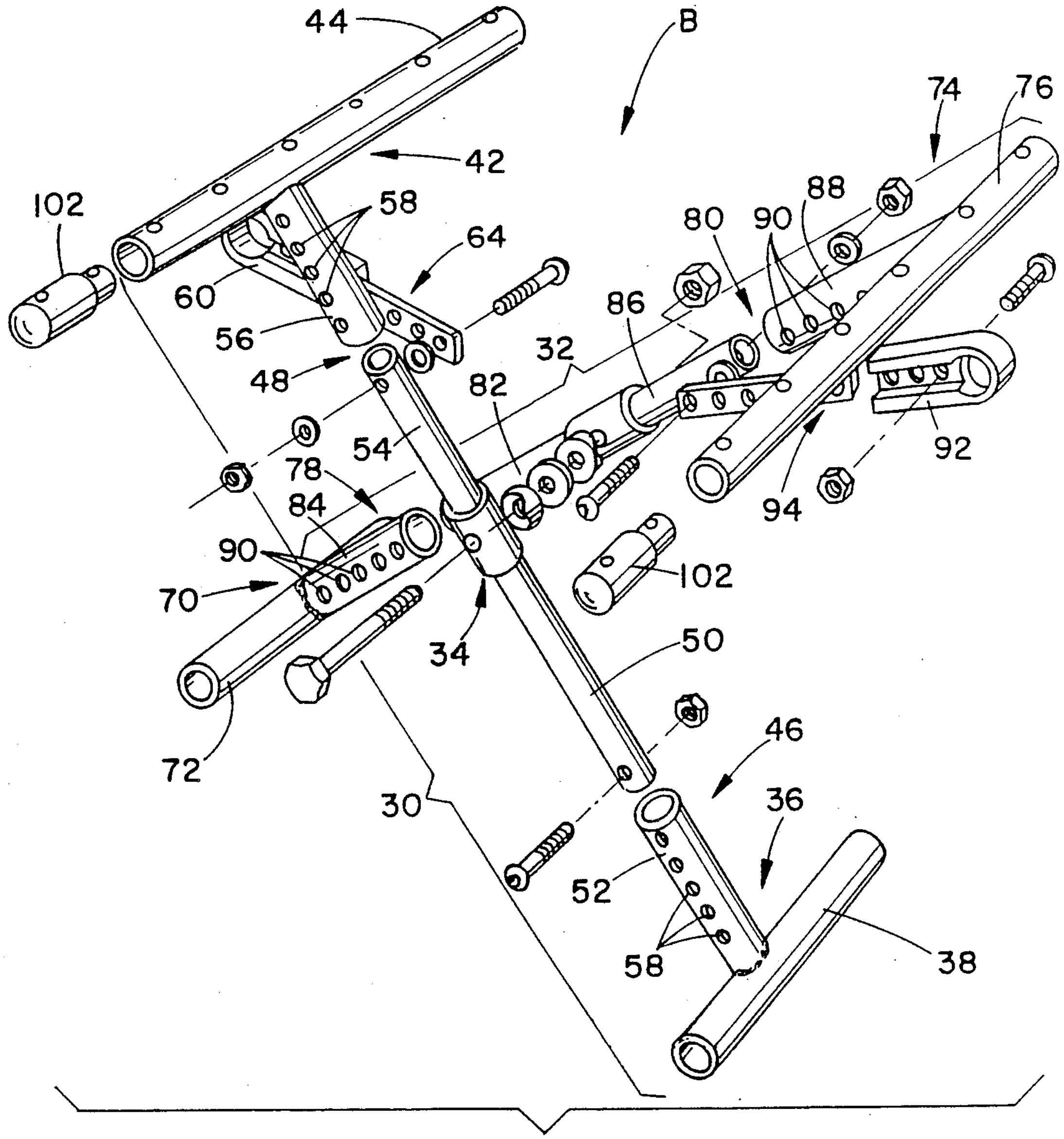
FIG. 3 is an exploded, detailed view of an adjustable folding mechanism in accordance with the present invention.

With particular reference to FIG. 3 and continuing reference to FIGS. 1 and 2, the adjustable cross brace folding mechanism B includes a first, multi-piece cross brace member 30 and a second multi-piece cross brace member 32 which are interconnected by a pivot assembly 34. The first cross brace member 30 is connected at a lower end 36 to a first pivot means 38 which is pivotally received on the lower side frame portion 16. The position of the first pivot means 38 on the side frame is fixed at the rear by abutting the rear lower side frame horizontal member 20 and at the front by a collar 40 which is clamped to the forward side frame portion lower tubular member 16.

The first cross brace member 30 further includes a first upper portion 42 which is interconnected with a first seat supporting member 44. The seat supporting member has regularly spaced apertures therealong through which the seat may be connected with sheet metal screws or the like. First lower and upper length adjusting means 46, 48 are provided in the lower and upper portions 36, 42, respectively. The first lower cross brace member adjusting means 46 includes a lower pair of telescopically received tubular portions 50, 52. The upper length adjusting means 48 includes an upper pair of telescopically received tubular portions 54, 56. Apertures 58 are disposed along one of the upper and lower portions at regular intervals.

A first link 60 is pivotally connected at one end with the first cross brace member 30 and is pivotally mounted on the forward upper horizontal frame portion 14. One end of the rear side frame upper horizontal portion 18 and a clamp 62 fix the relative position of the first link 60 on the side frame. A first link length adjusting means 64, such as two telescopically received link members having a plurality of apertures therein enable the length of the first link to be adjusted. The spacing of the apertures of the link adjustment means are coordinated with the intervals between the apertures 58 of the cross brace member length adjusting means.

The second cross brace member 32 is connected at a lower end 70 to a second pivot means 72 which is pivotally received on the lower side frame portion 16. The position of the second pivot means 72 on the side frame is fixed at the rear by abutting the rear lower side frame horizontal member 20 and at the front by a collar 40 which is clamped to the forward side frame portion lower tubular member 16.

The second cross brace member 32 further includes a second upper portion 74 which is interconnected with a second seat supporting member 76. The seat supporting member has regularly spaced apertures therealong through which the seat may be connected with sheet metal screws or the like. Second lower and upper length adjusting means 78, 80 are provided in the lower and upper portions 70, 74, respectively. The second lower cross brace member adjusting means 78 includes a lower pair of telescopically received tubular portions 82, 84. The upper length adjusting means 80 includes an upper pair of telescopically received tubular portions 86, 88. Apertures 90 are disposed along one of the upper portions and one of the lower portions at regular intervals. The intervals are selected such that adjusting the degree of telescopic receipt of the first and second, upper and lower pairs by one interval widens the chair in the open position by one inch, without adjusting the height of the seat.

A second link 92 is pivotally connected at one end with the second cross brace member 32 and is pivotally mounted on the forward upper horizontal frame portion 14. One end of the rear side frame upper horizontal portion 18 and a clamp 62 fix the relative position of the second link 92 on the side frame. A second link length adjusting means 94, such as two telescopically received link members having a plurality of apertures therein, enable the length of the second link to be adjusted. The spacing of the apertures of the link adjustment means is coordinated with the intervals between the apertures 58 and 90 of the cross brace member length adjusting means.

With continuing reference to FIGS. 1, 2, and 3, the seat C includes a lower seat portion 100 which is mounted at its edges to the first and second seat mounting members 44 and 76. When the seat is to be widened, the lower seat 100 is removed and replaced with a seat that has the appropriate additional width. Alternately, a wider seat section may be folded under for narrow widths and unfolded for wider widths. Commonly, widths at one inch intervals between 10 and 14 inches are provided.

As the child requires a wider seat, a longer seat may also be required. To accommodate a longer seat, extension members 102 are telescopically received with the seat supporting portions 44, 76. The seat attaching screw at the forward most end of the seat supporting member engages an aperture in the extension to fix it in place. One or more additional apertures are provided in the extension member 102 as may be appropriate to the length of the extension.

Figure 4:
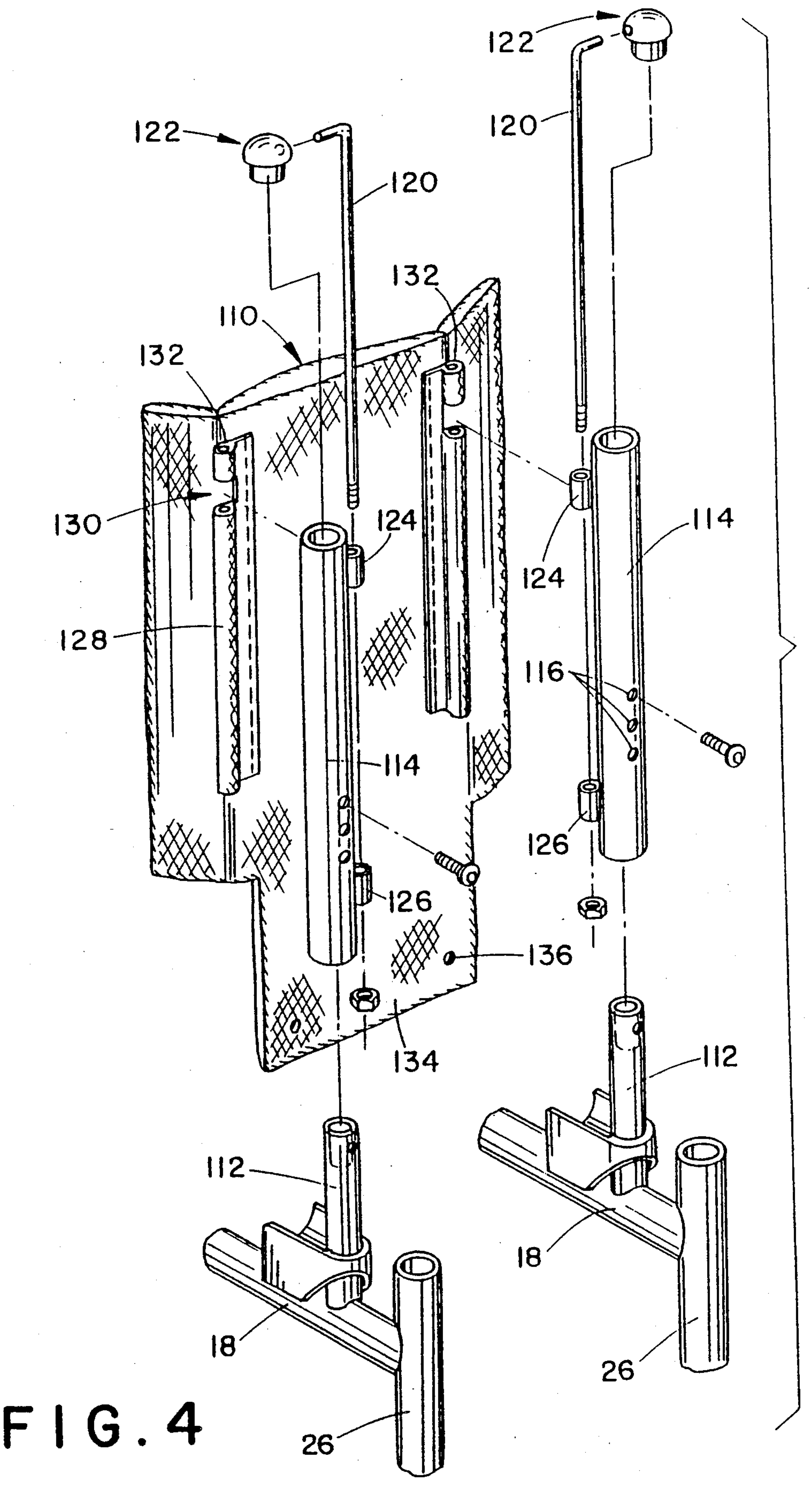
FIG. 4 is a detailed, exploded view of a rear seat support assembly in accordance with the present invention.

With particular reference to FIG. 4 and continuing reference to FIGS. 1 and 2, the seat C further includes a seat back portion 110. Posts 112 are mounted to the upper, rear horizontal frame portions 18 forward of the rear vertical member 26. A pair of rear seat back support members or tubes 114 are telescopically received with the post 112. The rear back support members 114 have plurality of apertures 116 therein for selectively adjusting their vertical extension relative to the side frames. These apertures provide limited height adjustment, for example, two inches of height adjustment. For greater height adjustment, the rear seat back support members 114 are replaced with longer tubes. Optionally, their length may be extended with extension members analogous to members 102. By positioning the posts 112 forward of the rear vertical member 26, improved wheelchair stability is achieved. That is, shifting the post 112 forward moves the center of gravity of the child on the chair forward relative to the rear axles which increases the stability of the chair and the resistance to rearward tipping.

In order to maintain the tubular members 114 free to receive clamps from orthopedic supports, pads, braces, and appliances, a separate stand-off member 120 is mounted adjacent an upper end of the rear seat back support member 114 by an upper mounting cap 122. The stand-off member is positioned by an upper stand-off sleeve 124 and a lower mounting stand-off mounting sleeve 126. The rear seat portion defines tubular pockets 128 for receiving the stand-off rods or members 120.

The tubular pocket may be constructed of a flexible cloth or fabric or may be molded of a relative flexible, but more rigid plastic. The stand-off is bent at an upper end to extend through a cut out or notch 130 in the tubular pocket such that higher pocket portions 132 act as a stop to hold the back 110 to the top of the stand-off members 120.

The back has a lower extension portion 134 to accommodate the increased height as the rear seat support members 114 are adjusted. Grommets 136 are provided for securing a lower end of the back, particularly when the back is raised sufficiently that tubular portions 128 are well above the horizontal seat portion 100.

Figure 5:
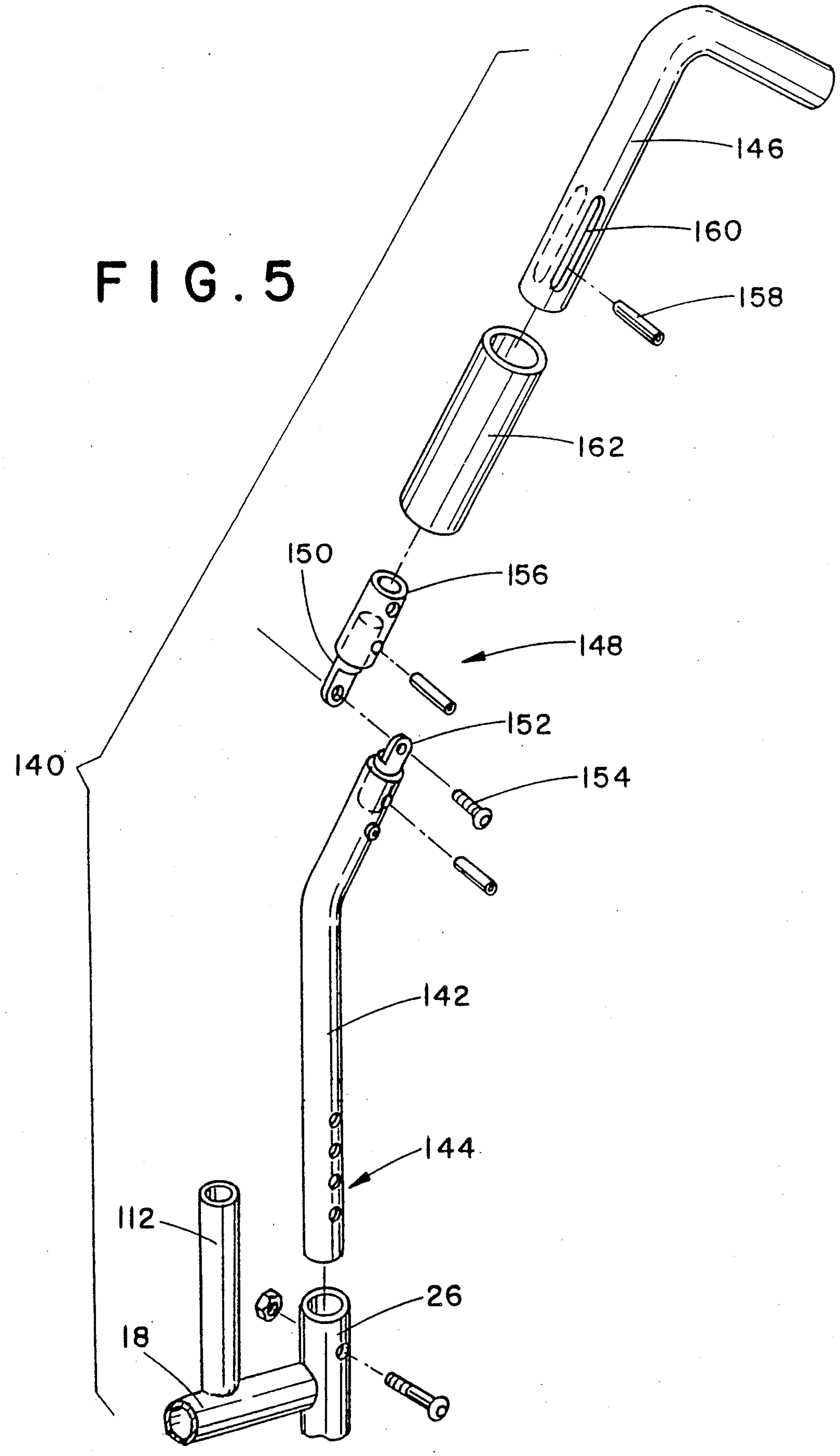
FIG. 5 is a detailed, exploded view of a rear push handle in accordance with the present invention.

With particular reference to FIG. 5 and continuing reference to FIGS. 1 and 2, a pair of rear push handle assemblies 140 are connected with the side frames. Each push handle assembly includes a lower push handle member 142 which is telescopically received in the side frame rear tubular member 26. A height adjustment means 144, such as a plurality of apertures and a selectively receivable pin member, enable the height of the push handle to be adjusted. Because the height of the push handle is scaled for an adult pushing the chair rather than to the child's size, a relatively limited range of adjustments may be provided.

A hand grip portion 146 which is adapted to be received in the pushing adult's hands is interconnected with the lower push handle member 142 by a selectively locking hinge member 148. The hinge member includes a pair of flanges 150, 152 which are pivotally connected by a pivot pin 154. The hand grip portion 146 is configured to be of a larger diameter than a hinge member portion 156 and the lower push handle member 142 such that it may be telescopically received thereover. A slide pin 158 and elongated slot 160 limit the range of telescopic, sliding movement of the hand grip member relative to the hinge 148 and lower push handle member 142. At an upper extreme of movement, the hinge is free to pivot about the pivot pin 154. In the lower extreme of movement, the hand grip portion telescopically receives an upper end of the lower push handle member 142 to prevent the hinge from pivoting. Optionally, a protective sleeve 162 may be slidably received over the hand grip portion 146 and the upper portion of the lower push handle member 142 to provide a protective and aesthetic covering to the selectively lockable hinge means.

Optionally, the hand grasp portion 146 may be adapted to spread further apart so that the hand grips are at the width of an adult even although the wheelchair may be narrowed to the width of a small child. This may be accomplished with hand grips which permanently flair outward, which flair outward on pivots can be selectively pivoted outward/inward, with an extension member, or the like.

Figure 6:
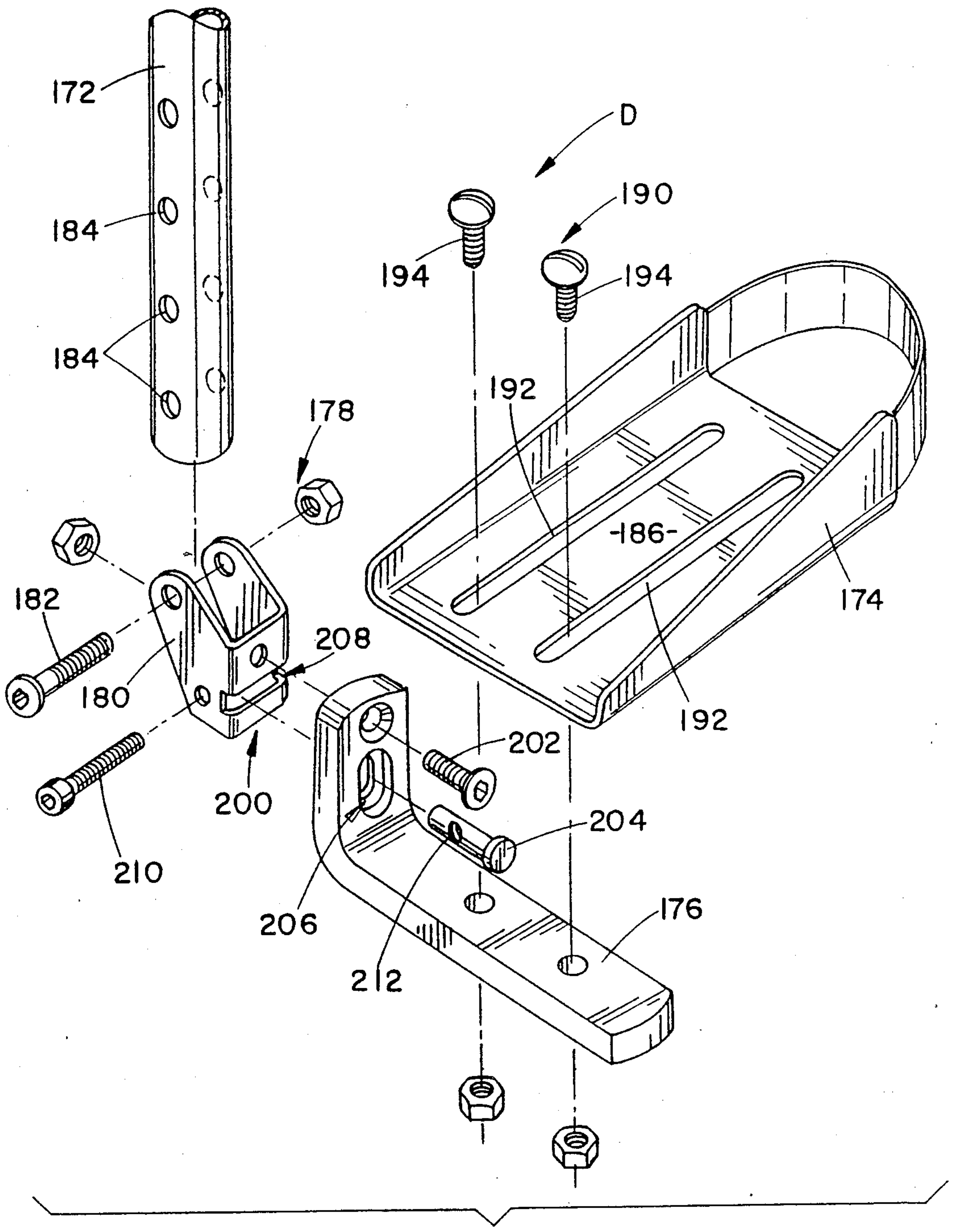
FIG. 6 is a detailed, exploded view of a front foot rest assembly of the wheelchair of FIG. 1; and, FIG. 7 is a detailed, exploded view of an adjustable front wheel mounting assembly of the wheelchair of FIG. 1.

With reference to FIG. 6 and continuing reference to FIGS. 1 and 2, the front foot rest assemblies D include a swing-away mounting assembly 170 which is attached to the forward vertical frame portion 22. In the preferred embodiment, the mounting assembly 170 provides a swing-away and removable interconnection between a mounting tube 172 and the forward vertical frame portion 22. A foot rest 174 is supported by a lateral member 176. A height adjustable mounting means 178 includes a bracket 180 which is selectively connected to the mounting tube 172 by a bolt and screw arrangement 182 through a selected one of a plurality of apertures 184. The foot supporting member 174 defines a generally horizontal foot supporting upper surface 186.

A forward and aft adjusting means 190 includes a pair of elongated slots 192 and mechanical fasteners 194 which selectively enable the foot rest member to be positioned forward and aft relative to the lateral member 176. In this manner, the forward and aft position of the foot supporting member relative to the chair is selectively adjustable.

A tilt adjusting means 200 enables the foot supporting surface 186 to be moved for dorsal and plantar flexion, i.e. tipped aft and forward respectively. A first mechanical fastener 202 extends through apertures in the bracket 180 and the lateral member 176 to provide a pivot. A second fastener 204 extends through a first elongated slot 206 in the lateral member and a second elongated slot 208 in the bracket 180. A threaded member 210 extends generally parallel to the elongated slot 208 and is threadedly engaged in a threaded bore 212 of the second fastener 204. By selectively rotating the threaded member 210, the second fastener 204 moves back and forward in slot 208 causing the lateral member 176 to pivot about the first fastener 202. In this manner, the angle or tip of the foot support surface 186 is selectively adjusted. The first elongated slot 206 compensates for the changing radius between the pivot member 202 and the linear elongated slot 208. Alternately, linear elongated slot 208 might be replaced with an arcuate slot of constant radius about pivot 202.

Figure 7:
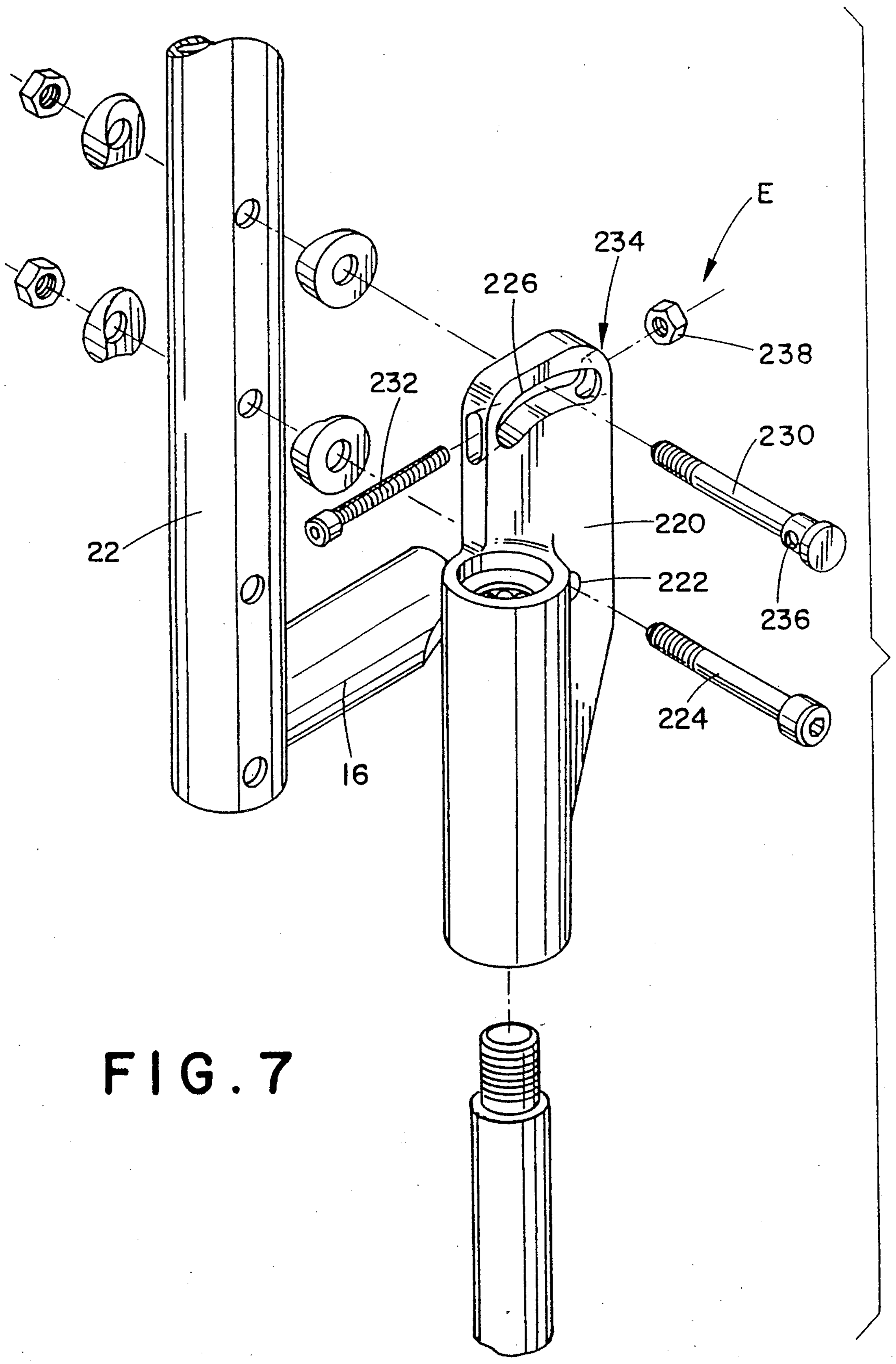

With particular reference to FIG. 7 and continuing reference to FIGS. 1 and 2, the front wheel mounting assembly E includes a mounting bracket 220 which has a pivot aperture 222 through which it is mounted by a pivot pin or fastener 224 to the forward, vertical frame portion 22. An elongated, arcuate aperture 226 is displaced from the pivot aperture 222 and has a radius of curvature which is the same as the distance or radius from the pivot aperture 222. A follower or second mounting fastener or pin 230 extends through the arcuate slot and is mounted to the forward vertical frame member 22. A threaded member 232 extends through a transverse passage 234 which extends generally parallel or tangential to the arcuate slot 226 and through a threaded aperture 236 in the follower member 230. A lock nut 238 is provided to hold the threaded member 232 within the longitudinal passage 234. By rotating the threaded member 232, the follower member 230 is caused to move through the arcuate slot 226. Because the follower member is rigidly mounted to the frame, this rotation causes the bracket 220 to pivot about the pivot member 224 changing the angle of attack of the front wheel assembly E. Clamping the lock nut 238 down locks the relative rotational position of the threaded member, hence the angle of the front wheel assembly. Alternately, the up angle adjustment means 200 of FIG. 6 may be utilized to adjust the angle of the front wheels.

With reference again to FIGS. 1 and 2, the rear wheel mounting assembly F includes a slotted plate 250 which is selectively mounted in matching apertures of rear frame vertical tubes 24, 26. The relative height at the rear portion of the chair may be selectively adjusted by selecting the apertures through which the plate 250 is mounted. The plate further includes an elongated slot 252 through which a wheel axle assembly 254 is mounted. By adjusting the forward and aft position within the slot, the forward and aft position of a rear wheel 256 is selectively adjustable. The height of the rear portion of the chair may also be adjusted by selecting different wheels, for example, 20 inch, 22 inch, or 24 inch diameter wheels.

An arm rest assembly 260 is mounted to the frame to either side of the lower seat portion 100. The arm rest assembly includes a generally U-shaped tubular member 262 whose aft end is received in a pivotal mounting bracket 264 and whose forward end is received in a stationary mounting bracket 266. A manual release button, such as a spring biased detent, selectively enables the arm rest front to be released from the forward mounting member 266 while being retained in the rear, pivotal mounting member 264. The arm rest is rearwardly pivoted about the pivotal mounting member to swing behind the seat back. Another manual release means, e.g. a spring detent, selectively enables the U-shaped tubular member aft end to be removed from the rear, pivotal mounting bracket 264 such that the entire arm rest assembly may be removed.

An asymmetric arm support member 270 is connected to a vertical post 272 which is telescopically received in a vertical mounting tube 274. A selectively adjustable manual release means, such as a spring bias detent, is selectively received in either forward apertures 276 or rearward apertures (not shown) of the vertical tube 274. The arm support member 270 has a longer end 278 and a shorter end 280. By rotating the assembly 180°, either the longer or shorter end can be placed forward to adjust the degree of forward extension of the arm rests to facilitate pulling up to a desk or the like.

The invention has been described with reference to the preferred embodiments. Obviously, modifications and alterations will occur to others upon reading and understanding the preceding specification. It is intended that the invention be construed as including all such alterations and modifications insofar as they come within the scope of the appended claims or the equivalents thereof.

Having thus described the preferred embodiment, the invention is now claimed to be:

1. A length adjustable wheelchair, comprising:

a pair of side frames, each of said side frames including a forward frame portion and a rearward frame portion, said forward and rearward frame portions of each of said side frames being slidably interconnected;

a pair of rear wheels, each of said rear wheels being rotatably mounted to one of said rearward frame portions;

a pair of front wheels, each of said front wheels being connected with one of said forward frame portions;

adjustable interconnecting means for releasably interconnecting said forward and rearward frame portions of each of said side frames to permit repeatable selective adjustment of the length of said side frames and of the distance between said front and rear wheels;

a seat assembly operatively connected with at least one of said forward and rearward frame portions of each of said side frames;

a pair of leg rest assemblies, each of said leg rest assemblies being mounted to one of said forward frame portions and including a foot supporting portion pivotally mounted thereto for pivoting movement about a generally horizontal axis such that said foot supporting portion can be pivoted between a lowered position extending generally across the front of the wheelchair and a raised position disposed generally parallel to said side frames, whereby said foot supporting portions can be pivoted to the raised position to facilitate access to the front of the wheelchair; and folding means for foldably interconnecting said side frames for movement between a folded position in which said side frames are substantially contiguous and an open position, whereby positioning said foot rest portions in the raised position facilitates folding said side frames to the folded position.

2. An adjustable wheelchair, comprising:

a pair of side frames, each of said side frames including a forward frame portion and a rearward frame portion, said forward and rearward frame portions of each of said side frames being slidably interconnected;

a pair of rear wheels, each of said rear wheels being operatively connected to one of said rearward frame portions;

a pair of forward wheels, each of said forward wheels being operatively connected to one of said forward frame portions;

a pair of seat supporting members;

means for supporting said seat supporting members in a predetermined vertical relationship relative to said side frames;

a pair of the swing-away foot rest assemblies, each of said foot rest assemblies being pivotally mounted on one of said forward frame portions for pivotal movement about a generally vertical axis;

adjustable interconnecting means for releasably interconnecting said forward and rearward frame portions of each of said side frames to permit repeatable selective adjustment of the distance between said forward and rear wheels such that the length of said side frames is repeatably selectively adjustable; and adjustable folding means for foldably interconnecting said side frames for movement between a folded position and an open position, said folding means permitting selective adjustment of the distance between said side frames in the open position, said folding means including a pair of cross brace members pivotally interconnected along a single central pivot axis by a central pivot means, each of said cross brace members having a lower end pivotally connected to one of said side frames along a lower pivot axis and an upper end connected to one of said seat supporting members, the lengths of said cross brace members being selectively adjustable to permit adjustment of the distance between said side frames while retaining the predetermined vertical relationship between said seat supporting members and said side frames.

3. The wheelchair as set forth in claim 2, further comprising at least one link having a first end pivotally connected between an upper portion of to one of said side frames and a second end pivotally connected to one of said cross brace members between said upper end thereof and said central pivot axis.

4. The wheelchair as set forth in claim 3, further comprising means for adjusting the distance between said first and second ends of said link.

5. The wheelchair as set forth in claim 2, wherein each of said cross brace members includes:

lower length adjusting means for adjusting the distance between said central pivot axis and said lower end of said cross brace member; and upper length adjusting means for adjusting the distance between said central pivot axis and said upper end of said cross brace member.

6. The wheelchair as set forth in claim 2, wherein each of said side frame members includes at least one socket for slidably receiving a removable arm rest.

7. A width adjustable wheelchair, comprising:

a pair of side frames;

a pair of seat supporting members;

means for supporting said seat supporting members in a predetermined vertical relationship relative to said side frames;

a pair of cross brace members pivotally interconnected along a single central pivot axis by a central pivot means, each of said cross brace members having a lower end pivotally connected to one of said side frames along a lower pivot axis and an upper end connected to one of said seat supporting members, said cross brace members including means for selectively adjusting the lengths of said cross brace members to permit adjustment of the distance between said side frames while retaining the predetermined vertical relationship between said seat supporting members and said side frames;

a seat supported between said seat supporting members;

a connecting link having a pivotal connection with one of said cross brace members and a pivotal connection with one of said side frames; and means for adjusting the length of said connecting link.

8. The wheelchair as set forth in claim 7, wherein each of said cross brace members includes:

an intermediate cross brace portion pivotally connected to said central pivot means;

a lower cross brace portion slidably received by said intermediate cross brace portion adjacent said lower end of said cross brace member to permit adjustment of the distance between said central pivot axis and said lower pivot axis; and an upper cross brace portion slidably received by said intermediate cross brace portion adjacent said upper end of said cross brace member to permit selective adjustment of the distance between said central pivot axis and said seat supporting member.

9. The wheelchair as set forth in claim 8, wherein each of said intermediate, lower, and upper cross brace portions includes a plurality of apertures therethrough for selectively receiving fasteners for selectively fixing the length of said cross brace members with a selected length.

10. The wheelchair as set forth in claim 7, further comprising:

a pair of front wheels;

a pair of mounting forks, each of said mounting forks rotatably supporting one of said front wheels, being pivotally connected to one of said side frames, and being pivotable about a fork pivot axis; and angle of attack adjusting means for selectively adjusting the angle of said fork pivot axis relative to said side frame.

11. The wheelchair as set forth in claim 7, further comprising:

a pair of front wheels, each of said front wheels being connected to one of said side frames;

a pair of rear wheels, each of said rear wheels being connected to one of said side frames; and means for adjusting the distance between said front and rear wheels.

12. An adjustable wheelchair, comprising:

a pair of side frames, each of said side frames including a forward frame portion and a rearward frame portion;

a pair of seat supporting members, each of said seat supporting members being disposed on one of said side frames;

a pair of rear wheels, each of said rear wheels being operatively connected to one of said rearward frame portions;

a pair of forward wheels, each of said forward wheels being operatively connected to one of said forward frame portions;

a pair of the swing-away foot rest assemblies, each of said foot rest assemblies being pivotally mounted on one of said forward frame portions for pivotal movement about a generally vertical axis;

adjustable interconnecting means for interconnecting said forward and rearward frame portions of each of said side frames to permit selective adjustment of the distance between said forward and rear wheels such that the length of said side frames is selectively adjustable;

adjustable folding means for foldably interconnecting said side frames for movement between a folded position and an open position, said folding means permitting selective adjustment of the distance between said side frames in the open position, said folding means including a pair of cross brace members pivotally interconnected by a central pivot means, each of said cross members (i) being selectively adjustable in length, (ii) having a lower end pivotally connected to one of said side frames, and (iii) having an upper end connected to with a one of said seat supporting members;

at least one link having a first pivotal connection with one of said side frames and a second pivotal connection with an upper portion of one of said cross brace members; and means for adjusting the distance between said first and second pivotal connections of said link.

13. An adjustable wheelchair, comprising:

a pair of side frames, each of said side frames including a forward frame portion and a rearward frame portion;

a pair of seat supporting members, each of said seat supporting members being disposed on one of said side frames;

a pair of rear wheels, each of said rear wheels being operatively connected to one of said rearward frame portions;

a pair of forward wheels, each of said forward wheels being operatively connected to one of said forward frame portions;

a pair of the swing-away foot rest assemblies, each of said foot rest assemblies being pivotally mounted on one of said forward frame portions for pivotal movement about a generally vertical axis;

adjustable interconnecting means for interconnecting said forward and rearward frame portions of each of said side frames to permit selective adjustment of the distance between said forward and rear wheels such that the length of said side frames is selectively adjustable;

adjustable folding means for foldably interconnecting said side frames for movement between a folded position and an open position, said folding means permitting selective adjustment of the distance between said side frames in the open position, said folding means including a pair of cross brace members pivotally interconnected by a central pivot means, each of said cross brace members (i) being selectively adjustable in length, (ii) having a lower end pivotally connected to one of said side frames, (iii) having an upper end connected to one of said seat supporting members, (iv) including means for adjusting the distance between said lower end of said cross brace member and said central pivot means, and (v) including means for adjusting the distance between said upper end of said cross brace member and said central pivot means.

* * * * *